United States Patent
Hingne et al.

(10) Patent No.: US 12,286,162 B2
(45) Date of Patent: Apr. 29, 2025

(54) CAB MOUNTING SYSTEM AND CAB MOUNTING

(71) Applicant: DEERE & COMPANY, Moline, IL (US)

(72) Inventors: Abhijit Hingne, Khamgaon (IN); Thiemo Flebbe, Mannheim (DE)

(73) Assignee: DEERE & COMPANY, Moline, IL (US)

( * ) Notice: Subject to any disclaimer, the term of this patent is extended or adjusted under 35 U.S.C. 154(b) by 324 days.

(21) Appl. No.: 18/046,391

(22) Filed: Oct. 13, 2022

(65) Prior Publication Data

US 2023/0242189 A1    Aug. 3, 2023

(30) Foreign Application Priority Data

Jan. 31, 2022 (DE) .......................... 102022102178.5
Jan. 31, 2022 (DE) .......................... 102022102179.3
Jan. 31, 2022 (DE) .......................... 102022102180.7

(51) Int. Cl.
| | | |
|---|---|---|
| *B62D 33/067* | (2006.01) | |
| *B62D 27/06* | (2006.01) | |
| *B62D 33/06* | (2006.01) | |
| *B62D 33/07* | (2006.01) | |
| *B62D 33/077* | (2006.01) | |

(52) U.S. Cl.
CPC ............ *B62D 27/06* (2013.01); *B62D 33/06* (2013.01); *B62D 33/067* (2013.01); *B62D 33/071* (2013.01); *B62D 33/077* (2013.01)

(58) Field of Classification Search
CPC ...... B62D 27/06; B62D 33/06; B62D 33/063; B62D 33/067; B62D 33/0608; B62D 33/0604; B62D 33/077

USPC .................................. 296/35.1, 193.04, 5, 7
See application file for complete search history.

(56) References Cited

U.S. PATENT DOCUMENTS

| | | |
|---|---|---|
| 10,494,039 B2 | 12/2019 | Young et al. |
| 10,549,796 B2 | 2/2020 | Helm et al. |
| 10,717,475 B2 | 7/2020 | Manternach et al. |
| 10,793,204 B2 | 10/2020 | Manternach et al. |

(Continued)

FOREIGN PATENT DOCUMENTS

| | | |
|---|---|---|
| CN | 204567810 U | 6/2018 |
| DE | 19961670 A1 | 8/2000 |
| EP | 2650195 A2 | 10/2013 |

OTHER PUBLICATIONS

Extended European Search Report and Written Opinion issued in European Patent Application No. 22197813.3 dated Jun. 15, 2023, in 18 pages.

(Continued)

*Primary Examiner* — Dennis H Pedder

(57) ABSTRACT

A cab mounting including a chassis holder and a cab holder. The chassis holder includes a chassis plate having a central region, designed to be fastened to a chassis of a vehicle, a lower end region, designed to fasten a suspension element, and an upper end region having an opening, designed for connecting to an upper bearing plate. The cab holder includes a cab plate, designed for fastening to a vehicle cab, and an upper bearing plate, which is fastened to the cab plate and has a U-shaped structure, designed in order to be held movably in the opening of the chassis plate, such that the chassis holder and the cab holder are movable relative to each other. The chassis holder is formed in one piece such that impacting dirt is scraped off.

10 Claims, 4 Drawing Sheets

(56) References Cited

U.S. PATENT DOCUMENTS 11,203,383 B2 12/2021 Manternach et al.
2018/0178746 A1 6/2018 Scott et al.

OTHER PUBLICATIONS

Extended European Search Report and Written Opinion issued in European Patent Application No. 22197815.8 dated Jun. 15, 2023, in 16 pages.
Extended European Search Report and Written Opinion issued in European Patent Application No. 22197816.6 dated Jun. 15, 2023, in 13 pages.

CAB MOUNTING SYSTEM AND CAB MOUNTING

CROSS-REFERENCE TO RELATED APPLICATIONS

This application claims priority to German Patent Application No. 102022102178.5, filed Jan. 31, 2022, German Patent Application No. 102022102179.3, filed Jan. 31, 2022, and German Patent Application No. 102022102180.7, filed Jan. 31, 2022, which are hereby incorporated by reference.

FIELD OF THE DISCLOSURE

The present disclosure relates to a cab mounting system and to a cab mounting for vehicles, which make it possible for the cab of a vehicle to be fastened on or at the chassis.

BACKGROUND

Agricultural and construction vehicles include an operator cab connected to the chassis of the vehicle.

SUMMARY

Vehicles, especially for the off-road sector, are used in demanding working environments. The vehicles may be construction vehicles, for example crawler vehicles, vehicles for excavation, or forestry vehicles for processing timber or agricultural vehicles.

The location of use is generally undeveloped terrain with slopes. Specifically, if there is a gradient and when used on soil or boulders, a pronounced inclination of the vehicle may occur, with an associated tipping or overturning of the vehicle in the event of an accident. In this situation, the operator should be protected as best as possible from injuries, firstly against possible collisions inside the cab, and secondly against being thrown out of the cab. In addition, the cab has to be held on the vehicle in such a manner that the cab is prevented from breaking loose in the event of tipping of the vehicle, and a safety cell for the operator is maintained even if the vehicle overturns.

Due to the use of the vehicle in open terrain and the associated working environment, an ingress of dirt on and in the vehicle is not prevented. Soiling thus occurs below the vehicle cab, and therefore the spring deflection may be impaired, particularly in the case of movably mounted cabs. In addition, the ingress of dirt may lead to noise being produced since gaps present between movable components of the cab mounting may be filled with dirt particles.

It is the object of the disclosure to avoid the problems discussed. The object is achieved by the disclosure according to one or more of the following embodiments. Further developments of the disclosure emerge from the following embodiments.

The disclosure relates to a cab mounting, having a chassis holder, having a chassis plate having a central region, designed to be fastened to a chassis of a vehicle, a lower end region, designed to fasten a suspension element, an upper end region having an opening, designed for connecting to an upper bearing plate, a cab holder, having a cab plate, designed for fastening to a vehicle cab, an upper bearing plate, which is fastened to the cab plate and has a U-shaped structure, designed in order to be held movably in the opening of the chassis plate such that the chassis holder and the cab holder are movable relative to each other, wherein the chassis holder is formed in one piece such that impacting dirt is scraped off.

The chassis holder has a corrugated molding or the like, so as to modify the transition angle between a central region and an upper region such that a ramp on which dirt particles are deflected in the direction of gravity is achieved. Deposits of dirt particles are prevented or minimized in this way. At the same time, the degree of self-cleaning is increased in the event of rain or during vehicle servicing, such that the maintenance complexity is minimized. As a result of the avoidance of accumulations of dirt, the functioning mode of the cab mounting as well as the avoidance of noises created by adhering dirt particles is ensured. The integral configuration of the chassis holder minimizes the part count and the production complexity.

In one embodiment, the molding can be provided in a region between the central region and the lower end region.

The largest accumulation of dirt takes place specifically in this transition between the central and the lower region, because this in the installed position is a horizontal face. The accumulation here can be prevented or reduced in a targeted manner.

In one embodiment, the molding can be provided on an upper side of the chassis holder.

The convexity in the direction of the upper side of the chassis holder in the installed position reduces the usual transition angle of 90 degrees in this region. Deposits of dirt particles over a large area are prevented in this way, and the cleaning by rain or when servicing by means of a high-pressure washer or the like is improved.

In one embodiment, a hydraulic actuator can be provided between the upper bearing plate and the chassis plate.

The hydraulic actuator enables the cab to be actively suspended in the vehicle and permits excitations by the vehicle chassis to be damped. With the aid of the data of an attitude sensor or position sensor, the active cab suspension can enhance the operating comfort and the safety in terms of controlling the vehicle.

In another embodiment, a position sensor can be provided on the upper end region of the chassis holder, the position sensor interacting with a linkage for guiding the upper bearing plate and lower bearing plate.

By means of the position sensor which interacts with the linkage, which constitutes a bearing between the lower and the upper bearing plate, the vertical distance between the upper and the lower bearing plate can be detected. The position sensor can be an angle sensor or a distance sensor as long as a distance can be calculated from the measurement data. Using the calculated distance, an active suspension of the cab can be realized. This actively activates hydraulic actuators which are present, and therefore an adjustment is undertaken. Furthermore, a safety-relevant state can be detected, and therefore even in this case the hydraulic actuators can be actively driven into a separate position which ensures the greatest possible safety for the operator.

The disclosure also relates to a cab mounting system having at least two cab mountings according to the preceding embodiments, wherein a Panhard rod is held movably between the cab plate of a cab mounting and the chassis holder of the further cab mounting.

The above and other features will become apparent from the following detailed description and accompanying drawings.

BRIEF DESCRIPTION OF THE DRAWINGS

The disclosure and embodiments will be explained with reference to the figures, in which.

Like reference numerals are used to indicate like elements throughout the several figures.

DETAILED DESCRIPTION

The embodiments or implementations disclosed in the above drawings and the following detailed description are not intended to be exhaustive or to limit the present disclosure to these embodiments or implementations.

Figure 1:
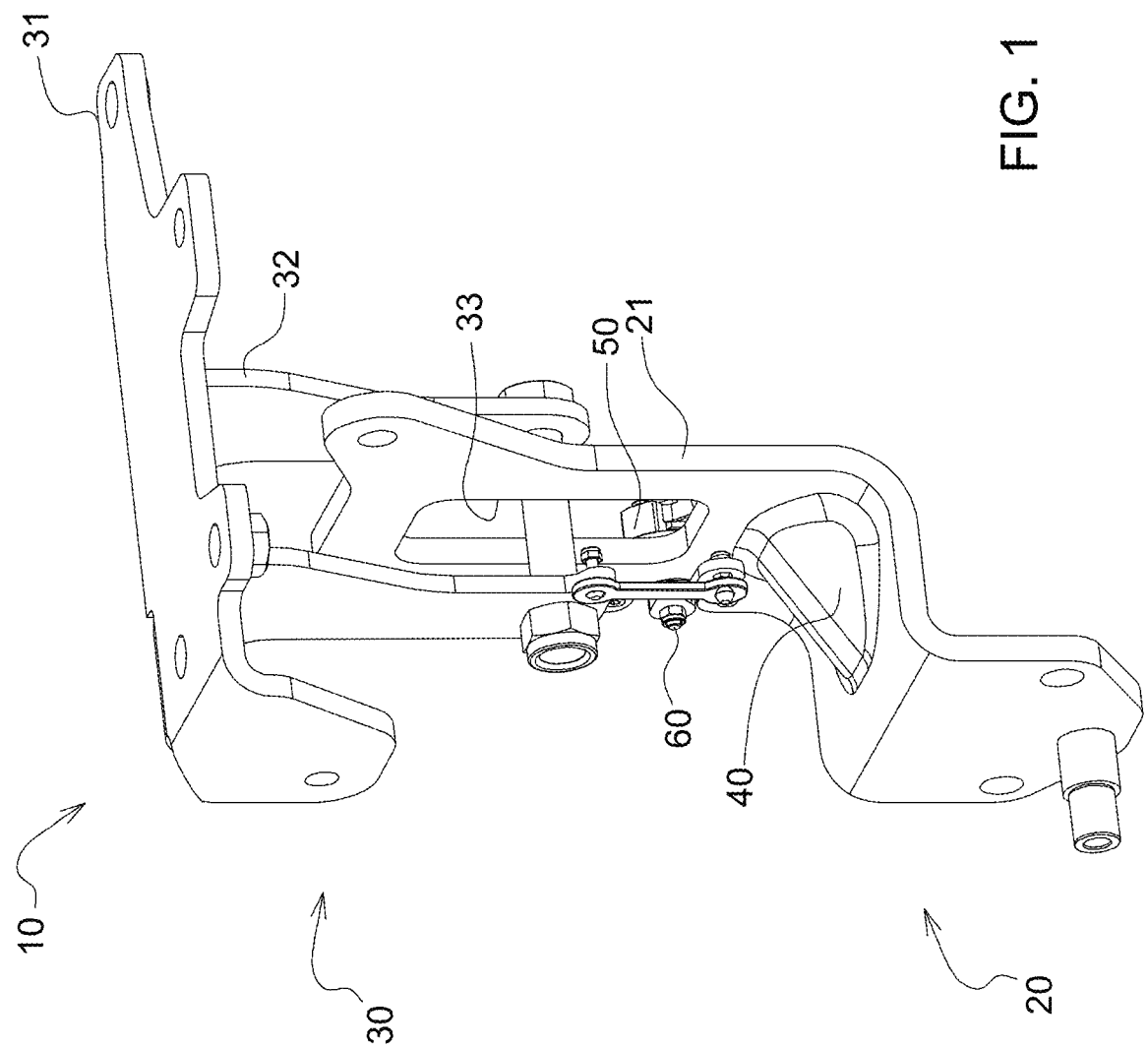
FIG. 1 shows a detailed view of an embodiment.

FIG. 1 illustrates the cab mounting 10 in an isometric view. The cab mounting 10 is in a two-part form. The lower part is the chassis holder 20, the upper part the cab holder 30. The chassis holder 20 includes a chassis plate 21 which is provided to be fastened to a part of the vehicle, for example a component part of the chassis, by means of screwing or welding. The chassis plate 21 has a lower region for fastening to a vehicle, a central region having a horizontal extent and an upper region for movable fastening to the upper bearing plate 32 of the cab holder 30.

The center of the upper region of the chassis plate 21 has an opening 33 or recess which serves to receive part of the upper bearing plate 32. The opening 33 can be milled, bored, or punched.

The cab holder 30 has a cab plate 31 which is designed to be attached to a component part of the cab. For this purpose, the cab plate 31 can have bores for screws, but it can alternatively also be welded. On the cab plate 31, an upper bearing plate 32 is fixedly connected predominantly perpendicularly in a central region of the cab plate 31. For this purpose, the upper bearing plate 32 has two mutually parallel webs which are fastened at a fixed distance to the cab plate 31 and have two free ends. In an end region of the upper bearing plate 32, the free ends are connected to one another by a bolt, a screw, or a metal rod. The bolt sits at the same time inside the opening 33 of the chassis plate 21 and ensures a movable connection to the upper bearing plate 32, and therefore also of the chassis holder 20 to the cab holder 30. The relative moveability of the cab holder 30 and of the chassis holder 20 is defined by the geometrical height and width of the opening 33.

The chassis plate 21, in the installed position, at a transition from the lower region to the central region has a molding 40 which causes a reduction of the transition angle. The design of the molding 40 is shaped as a corrugation or convexity in the bending radius between the upper and the lower region. However, the molding 40 can also be a deformation across the entire width of the chassis plate 21, a bend of 45 degrees, or be composed of a plurality of corrugations or convexities. The design has the effect that incident dirt, as a result of the effect of gravity, is directed away from the chassis plate 21 and the transition radius, and that no accumulation of dirt arises on said chassis plate 21. The accumulation of dirt particles can be prevented as a result, and the mobility of the chassis plate 21 and of the upper bearing plate 32 is ensured. The molding 40 can include an angle of 10 to 80 degrees in relation to the horizontal plane. In conjunction with the action of water thereon, for instance by rain or by active cleaning of the vehicle, the removal of dirt particles at the location of the transition can moreover be simplified, the maintenance complexity being minimized as a result.

The chassis holder 20 and the cab holder 30 are additionally connected movably to each other by the linkage 60. The linkage 60 serves primarily to detect the distance of the chassis holder 20 and the cab holder 30 from each other. For this purpose, a position sensor 50 in the form of an angle sensor which detects the angle of the deflection of the linkage 60 is attached to the chassis plate 21. By means of an electrical signal output from the sensor 50 together with a possible calculation using a control device (e.g., a controller including a processor and memory), the distance can be calculated or measured directly. The distance can be used for controlling an active damping of the cab.

Figure 2:
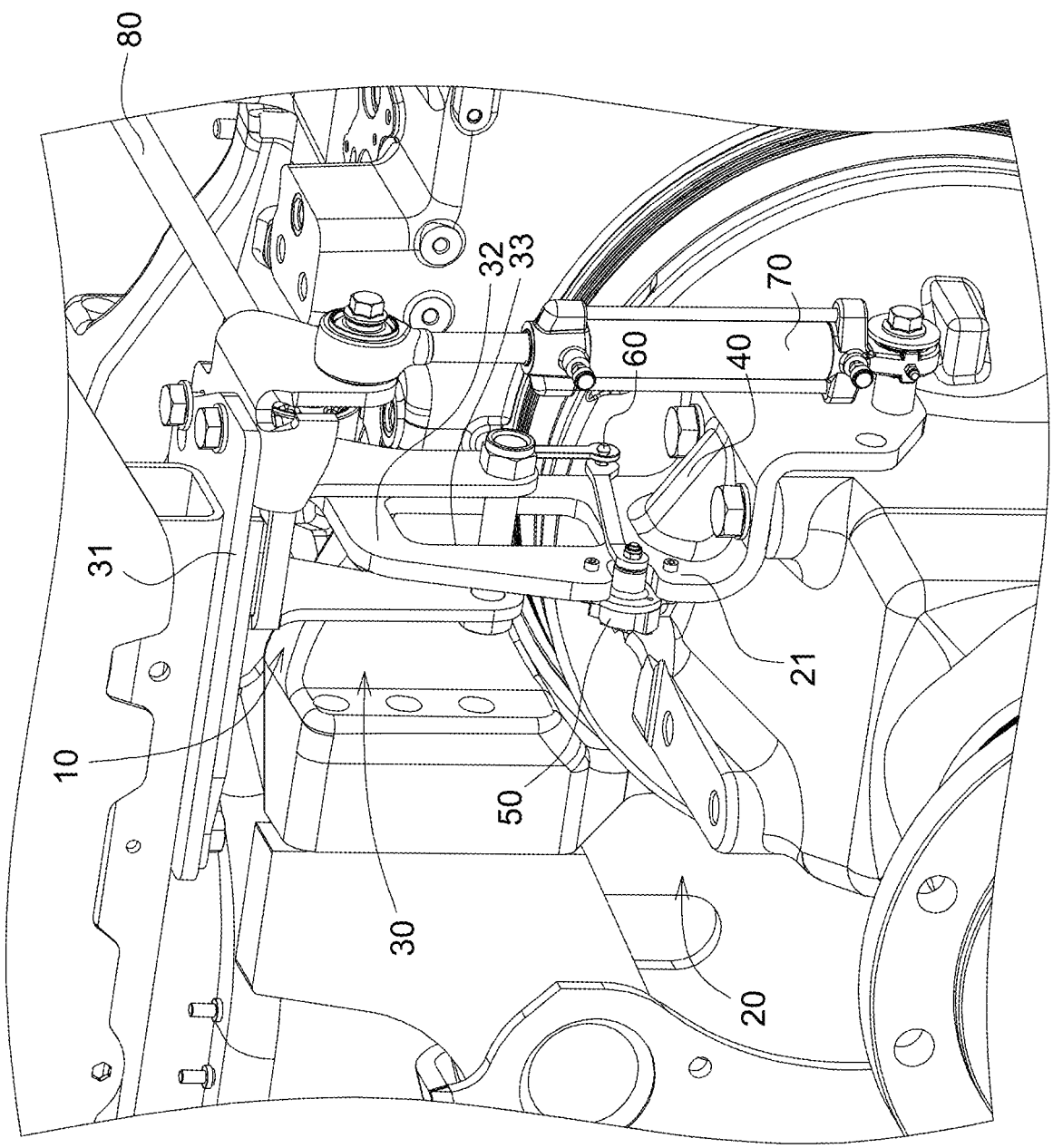
FIG. 2 shows an embodiment in an installed state in a vehicle.

FIG. 2 shows the cab mounting 10 in an installed position in the vehicle. The cab mounting 10 is attached to a chassis region of the vehicle by the chassis holder 20. This can be undertaken by means of screwing, riveting, welding or the like. The cab mounting 10 is fastened to a lower side of the cab by the cab holder 30 and the cab plate 31. The connection can likewise be produced by screwing, riveting, or welding. A hydraulic actuator 70 is attached to one side of the cab mounting 10. Said hydraulic actuator is used for actively adjusting the cab mounting 10 such that the distance between the cab holder and the chassis holder 20 can be adjusted, or active damping of the cab is made possible. The hydraulic actuator is fastened to the chassis holder 20 and to the cab holder 30.

During use, the cab moves differently with respect to the vehicle chassis. This movement results in a relative movement of the upper bearing plate 32 and the chassis plate 21. By means of the linkage 60 and the position sensor 50, this movement can be detected and the hydraulic actuator 70 actively activated therefrom.

The upper bearing plate 32 is connected to the chassis plate 21 by a web which is attached between the two ends of the upper bearing plate 32. It is likewise possible for only the chassis plate 21 to have two free ends. In the event of a vehicle overturning or of a powerful action of force on the cab, the upper bearing plate 32 maintains the connection of the cab to the vehicle such that rolling over or detaching is prevented.

Figure 3:
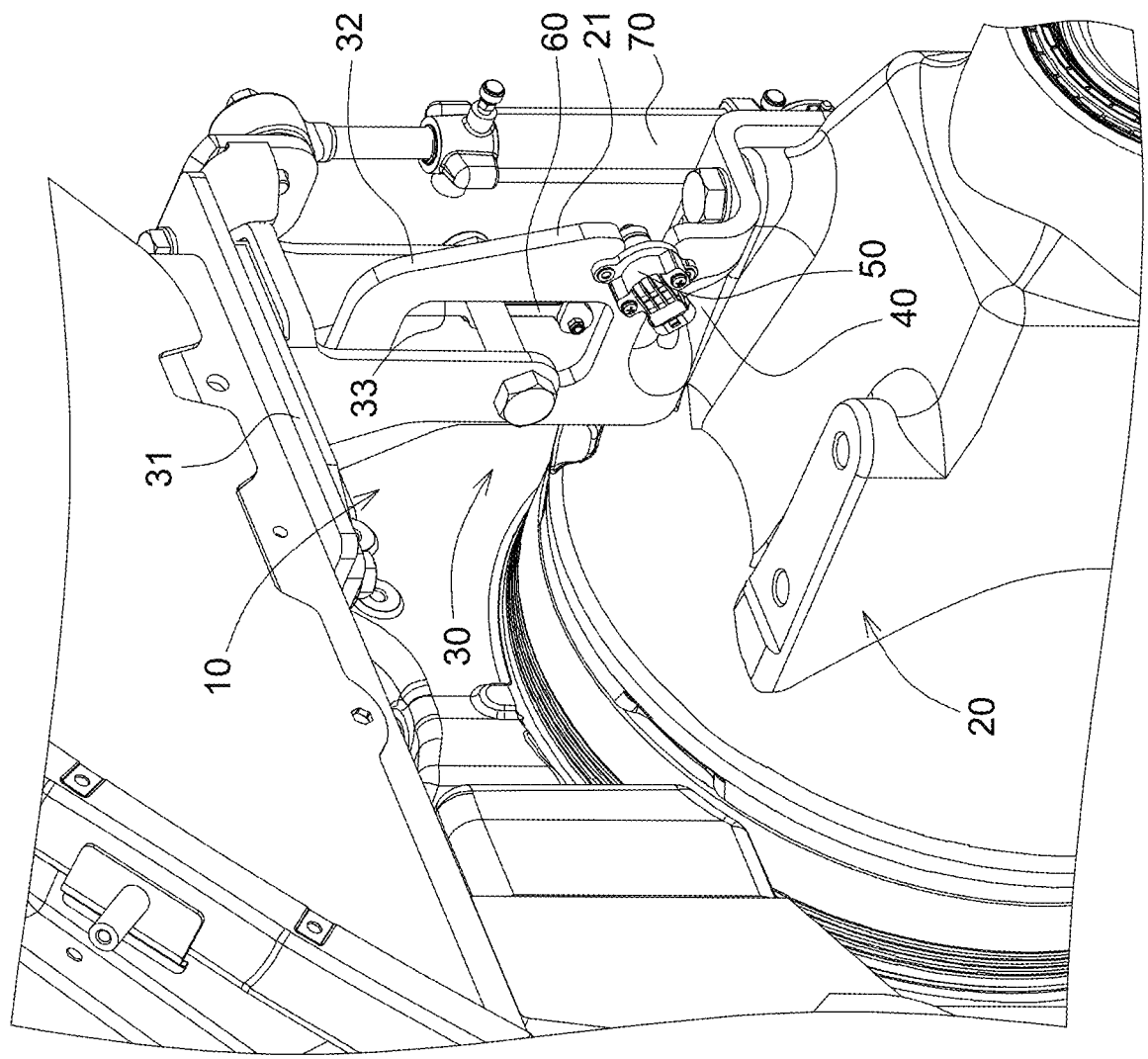
FIG. 3 shows another embodiment in an installed state.

FIG. 3 shows a further view of the cab mounting 10. The molding 40 here is shown in a further lateral view. The height of the molding 40 can be variably established, as a result of which the angle, which in the installed position is between the upper side of the molding 40 and the horizontal, can be varied.

The position sensor 50, which is attached to the chassis plate 21, is connected to a controller, which is not illustrated. By means of the controller, the movement behavior of the cab can be detected and calculated such that the hydraulic actuator 70 can be actively activated. The sensor 50 can be provided on the chassis plate 21. If the installation situation permits, this can also be provided on the upper bearing plate 32. The sensor 50 can also be a linear position sensor. Alternatively, the hydraulic actuator 70 can have a positional measurement, such that an additional position sensor 50 can be dispensed with.

Figure 4:
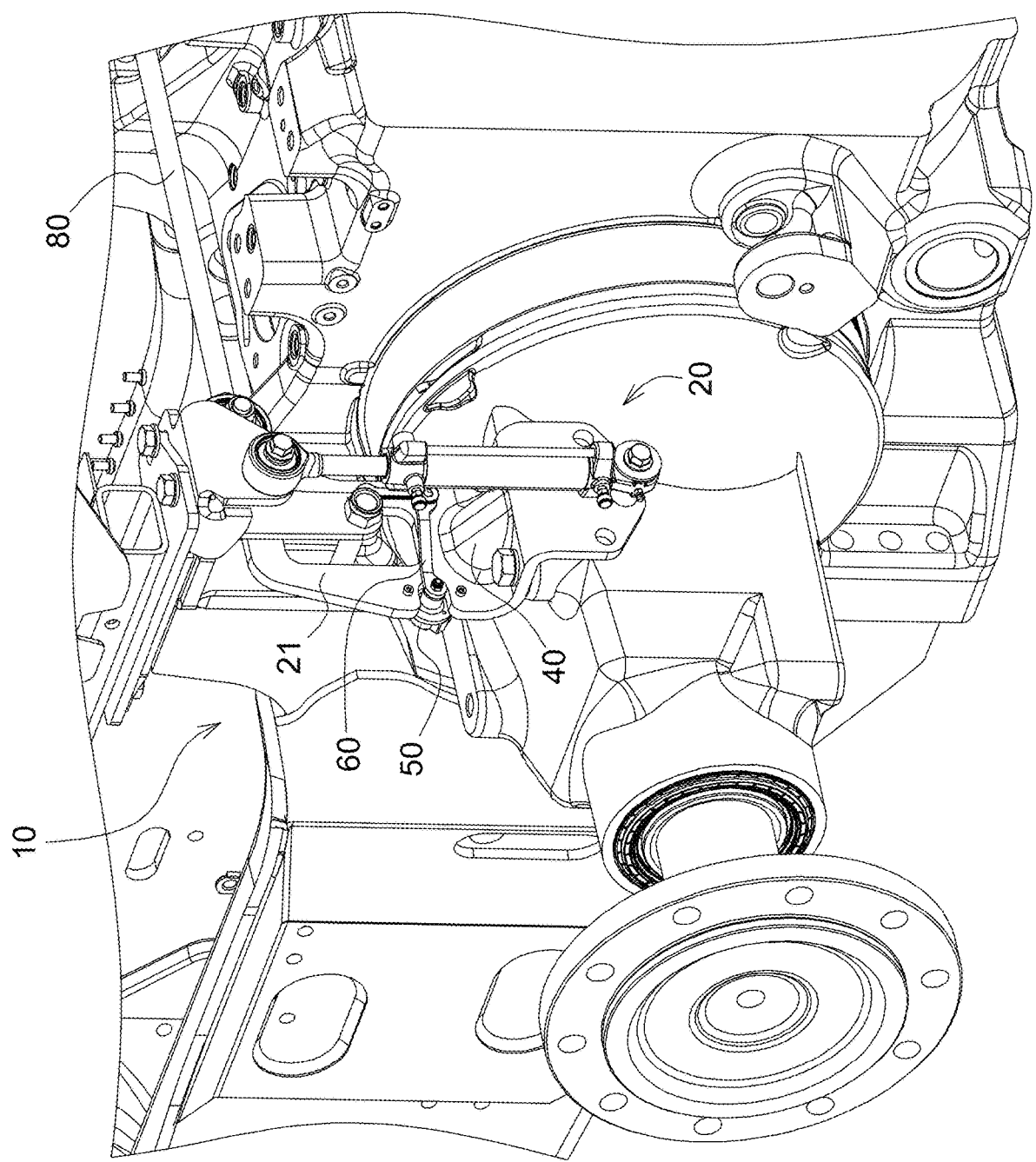
FIG. 4 shows an embodiment on an axle module of a vehicle.

FIG. 4 shows the cab mounting 10 which is fastened to a section of the axle housing of a vehicle. In addition to the embodiments described previously, the cab mounting 10 has a Panhard rod 80 which connects an assembly of the cab mounting 10 to a further assembly on the other side of the cab. The Panhard rod 80 ensures the limitation of the degrees of freedom and prevents the cab structure, which is fastened to the cab plate 31, from deviating laterally. By this means, the cab mounting 10 according to the disclosure can be integrated as a cab mounting system in a vehicle. The system is adaptable to any cab dimensions and permits use within a wide vehicle sector for different working tasks.

The cab mounting system can have at least one position sensor 50 on one cab mounting side, but attachment of the position sensor 50 on both sides is also possible, such that an unequal height in both sides of the cab mounting 10 can be detected.

Particularly in the region of the axles of vehicles, a great ingress and building up of dirt takes place. Due to the cab mounting 10 of the present disclosure, the building up of dirt in the critical region of the mutually movable components is prevented. The cab mounting 10 and the cab mounting system according to the present disclosure ensure satisfactory functioning, by preventing buildup of dirt, jamming of the movable parts, and any resulting annoying noises.

The terminology used herein is for the purpose of describing example embodiments or implementations and is not intended to be limiting of the disclosure. As used herein, the singular forms "a," "an," and "the" are intended to include the plural forms as well, unless the context clearly indicates otherwise. It will be further understood that the any use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof.

Those having ordinary skill in the art will recognize that terms such as "above," "below," "upward," "downward," "top," "bottom," etc., are used descriptively for the figures, and do not represent limitations on the scope of the present disclosure, as defined by the appended claims. Furthermore, the teachings may be described herein in terms of functional and/or logical block components or various processing steps, which may include any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described embodiments or implementations.

As used herein, "e.g.," is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example embodiments or implementations of the present disclosure, these descriptions should not be viewed in a restrictive or limiting sense. Rather, there are several variations and modifications which may be made without departing from the scope of the appended claims.

What is claimed is:

1. A cab mounting, comprising:
   a chassis holder including a chassis plate having a central region, designed to be fastened to a chassis of a vehicle, a lower end region, designed to fasten a suspension element, and an upper end region having an elongated opening, designed for connecting to an upper bearing plate; and
   a cab holder including a cab plate, designed for fastening to a vehicle cab, and the upper bearing plate, which is fastened to the cab plate and has a U-shaped structure, designed in order to be held movably in the opening of the chassis plate, such that the chassis holder and the cab holder are movable relative to each other.

2. The cab mounting of claim 1, further comprising:
   a molding in a region between the central region and the lower end region.

3. The cab mounting of claim 2, wherein the molding is provided on an upper side of the chassis holder.

4. The cab mounting of claim 1, further comprising:
   a hydraulic actuator between the upper bearing plate and the chassis plate.

5. The cab mounting of claim 1, further comprising:
   a position sensor on the upper end region of the chassis holder, the position sensor interacting with a linkage connected between the chassis holder and the cab holder.

6. A cab mounting system, comprising:
   a first cab mounting and a second cab mounting; and
   a panhard rod movably held between the cab plate of the first cab mounting and the chassis holder of the second cab mounting;
   wherein each of the first cab mounting the second cab mounting comprises:
   a chassis holder including a chassis plate having a central region, designed to be fastened to a chassis of a vehicle, a lower end region, designed to fasten a suspension element, and an upper end region having an elongated opening, designed for connecting to an upper bearing plate; and
   a cab holder including a cab plate, designed for fastening to a vehicle cab, and the upper bearing plate, which is fastened to the cab plate and has a U-shaped structure, designed in order to be held movably in the opening of the chassis plate, such that the chassis holder and the cab holder are movable relative to each other.

7. The cab mounting system of claim 6, further comprising:
   a molding in a region between the central region and the lower end region.

8. The cab mounting system of claim 7, wherein the molding is provided on an upper side of the chassis holder.

9. The cab mounting system of claim 6, further comprising:
   a hydraulic actuator between the upper bearing plate and the chassis plate.

10. The cab mounting system of claim 6, further comprising:
    a position sensor on the upper end region of the chassis holder, the position sensor interacting with a linkage connected between the chassis holder and the cab holder.

* * * * *